Figure 2:
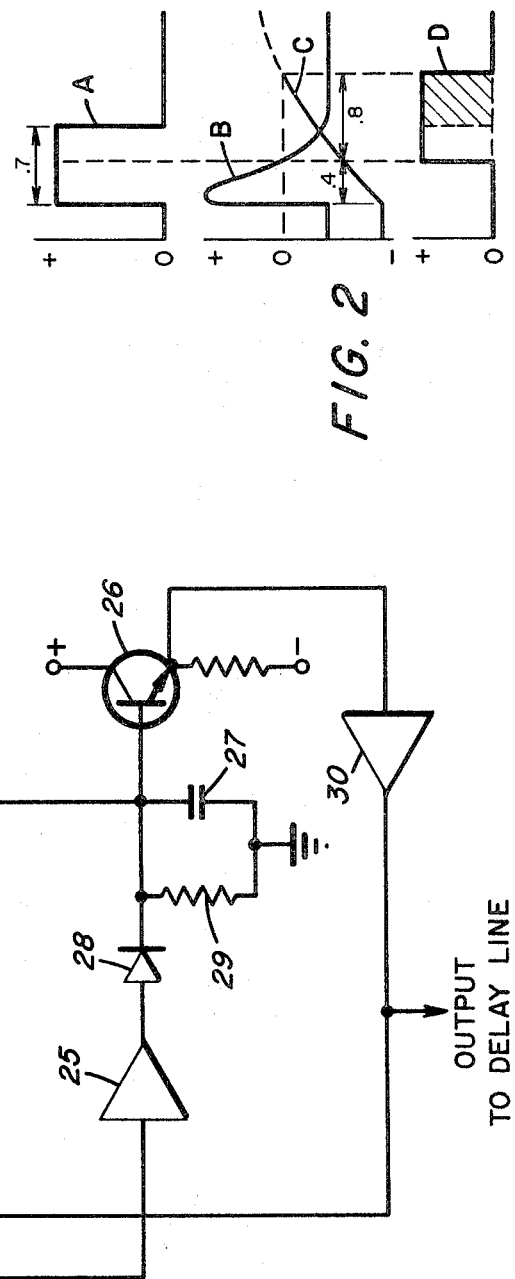

United States Patent

[11] 3,582,676

| [72] | Inventor | Erik Rosenbaum<br>Randallstown, Md. |
|---|---|---|
| [21] | Appl. No. | 762,008 |
| [22] | Filed | Sept. 24, 1968 |
| [45] | Patented | June 1, 1971 |
| [73] | Assignee | The Bendix Corporation |

[54] PULSE LENGTH NORMALIZING AND SHORT PULSE ELIMINATING CIRCUIT
5 Claims, 2 Drawing Figs.

| [52] | U.S. Cl. | 307/234,<br>328/111, 328/112, 328/127, 328/135 |
|---|---|---|
| [51] | Int. Cl. | H03k 5/20 |
| [50] | Field of Search | 307/234;<br>328/111, 112, 127, 135 |

[56] References Cited
UNITED STATES PATENTS

| 2,946,943 | 7/1960 | Nye et al. | 328/127X |
| 3,039,059 | 6/1962 | Fisher | 328/127X |
| 3,105,939 | 10/1963 | Onno et al. | 328/34 |
| 3,431,490 | 3/1969 | Kwap et al. | 307/234X |
| 3,454,886 | 7/1969 | Bijl et al. | 328/127X |

*Primary Examiner*—Donald D. Forrer
*Assistant Examiner*—R. C. Woodbridge
*Attorneys*—Plante, Arens, Hartz and O'Brien, Bruce L. Lamb and William G. Christoforo

ABSTRACT: A differentiating circuit and an integrating circuit are combined in a logic gate to suppress transmission of pulses whenever an effective output appears from either circuit. The time constant of the differentiator determines minimum length and that of the integrator determines maximum length of transmitted pulses.

PATENTED JUN 1 1971

3,582,676

OUTPUT TO DELAY LINE

PULSE INPUT

INVENTOR
ERIK ROSENBAUM

BY  *Bruce L. Lamb*

ATTORNEY

PULSE LENGTH NORMALIZING AND SHORT PULSE ELIMINATING CIRCUIT

The present invention relates to pulse length normalizing circuits. More particularly it relates to a circuit capable of rejecting an electrical pulse of shorter duration than a desired minimum and of transmitting pulses of standard duration whenever the duration of applied pulses exceeds the minimum.

U.S. Pat. No. 3,226,570 entitled "Short Pulse Eliminator" by the present inventor describes means for blocking the transmission of pulses of shorter duration than an acceptable minimum. The invention there described is used in transponders to prevent reply to spurious interrogation signals in an Air Traffic Control radar system. The prior means tested the length of received pulses against a delay line cut to the minimum acceptable pulse length ($0.5\mu s$) and rejected all pulses shorter than that standard while passing without alteration pulses of greater duration.

The uses of the present invention are similar to those of the referenced prior invention. The function hereof is similar in rejecting pulses shorter than a desired minimum, but differs in that pulses longer than the minimum are normalized to a standard length. For example, assuming $0.5\mu s$ as the minimum acceptable pulse length, the present invention will reject a $0.3\mu s$ pulse, stretch a $0.6\mu s$ pulse to $0.8\mu s$, and shorten a $1.0\mu s$ pulse to $0.8\mu s$. The normalized pulse length of $0.8\mu s$ is the value selected in the preferred embodiment. It will later become evident that the length to which pulses are normalized is an arbitrary design feature and the principals of the invention may be applied to generate pulses of any desired normalized length.

The principal object of this invention is to provide a means for normalizing the length of acceptable pulses.

Another object of the invention is to provide means for rejecting pulses of unacceptable length.

Still another object of the invention is to provide means capable of performing the foregoing functions which do not require the use of a delay line.

Briefly, the invention comprises a differentiating network and an integrating network connected to a logic gate within a closed positive feedback loop. The logic gate may suitably be of the NOR type arranged to inhibit transmission of pulses upon the appearance of a logical "one" at the gate input. The differentiating network has a time constant approximately equal to the duration of pulses to be rejected and provides a logical one to the NOR gate to inhibit pulse transmission for that time interval. The time constant of the integrating network is chosen so as to charge a logical one level after the lapse of a period equaling the normalized pulse time and thereafter inhibit transmission of pulses.

Figure 1:
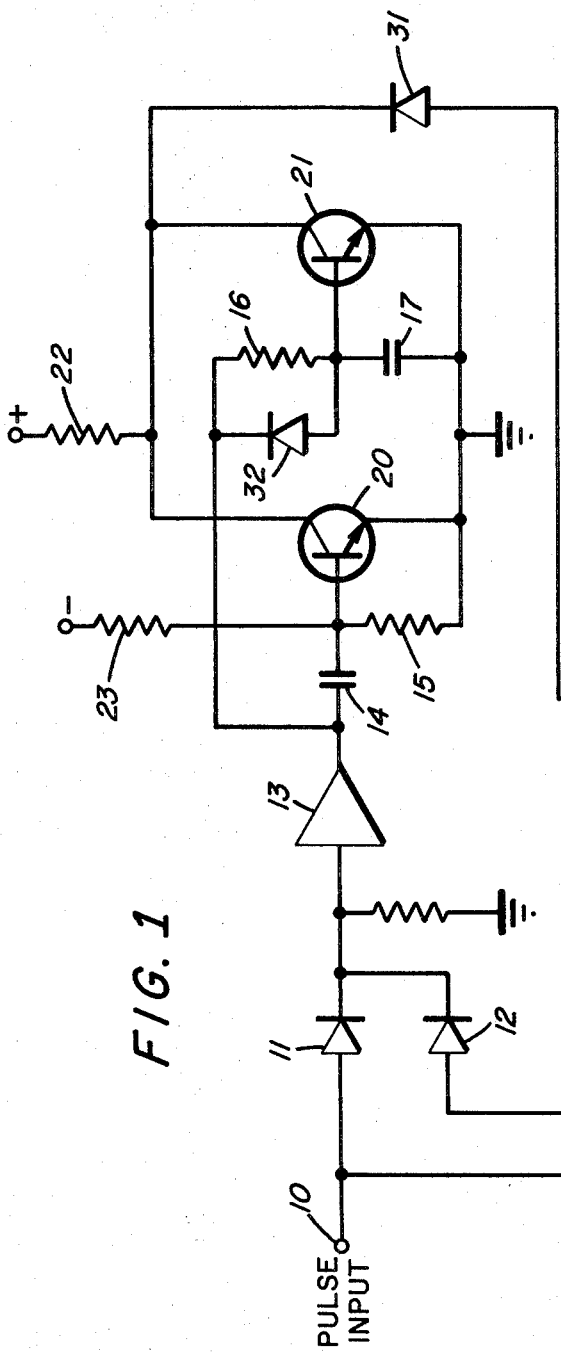

In the drawings:

FIG. 1 is a functional block diagram, partly in schematic form, of one embodiment of the invention; and FIG. 2 is a waveform diagram useful in explaining the operation of the invention.

Referring to FIG. 1, input pulses from a transponder video detector or similar pulse source are applied to terminal 10. An OR circuit including diodes 11 and 12 receives as one input pulses from terminal 10. The output of the OR circuit is amplified and limited at 13 and then applied to a differentiating circuit formed by capacitor 14 and resistor 15. The amplified pulses from amplifier 13 are also applied to an integrating network formed by resistor 16 and capacitor 17. Transistors 20 and 21 are connected in a NOR gate configuration with the collectors thereof connected to a common load resistor 22 and with the emitters grounded. The base of transistor 20 is connected to the differentiating network of capacitor 14 and resistor 15. A resistor 23 connected from a negative voltage source to the base of transistor 20 normally biases the transistor nonconductive since the transistor is of the NPN type. Transistor 21 is likewise biased to be normally nonconductive by a constant negative voltage supplied from amplifier 13.

Pulses from terminal 10 are applied to the input of an amplifier 25 and thence to a pulse stretcher circuit which includes transistor 26. Transistor 26 is connected as an emitter follower with input to the base from a storage capacitor 27 which is charged by positive pulses through a diode 28 from amplifier 25. The charging time constant of capacitor 27 is very small since it is determined by the low forward resistance of diode 28. The discharge time constant of capacitor 27, however, is relatively much larger since the discharge path is through a resistor 29. As a result the output of transistor 26 rises rapidly upon the appearance of a pulse from amplifier 25 and maintains the output for some time after the disappearance of the input. The output of transistor 26 is amplified in a driver circuit 30, which may furnish output pulses to a delay line or other utilization circuit. The output of driver 30 is applied in a positive feedback sense to diode 12, the second input of the OR gate. A gate diode 31 connects the pulse stretcher storage capacitor 27 to the NOR gate load resistor 22. With both transistors 20 and 21 nonconductive a positive bias will be applied to the cathode of diode 31, reverse biasing the diode and allowing a charge to accumulate in capacitor 27 to produce an output from transistor 26. When either transistor 20 or 21 becomes conductive, the cathode of diode 31 is effectively grounded to rapidly discharge capacitor 27 and consequently inhibit output from transistor 26.

The operation of the invention is best explained by reference to the waveform diagrams of FIG. 2. In waveform A a positive pulse of $0.7\mu s$ duration is shown as the input at terminal 10. This pulse will pass through diode 11 of the OR gate and amplifier 13 to be differentiated by capacitor 14 and resistor 15, producing waveform B. Initially waveform B is at a negative level determined by the quiescent bias on the base of transistor 20. When the leading edge of pulse A appears, waveform B rises rapidly to a positive level and then commences to decay towards the initial negative level. During the time waveform B is at a positive level transistor 20 is conductive, forward biasing diode 31 and inhibiting output from transistor 26. The time constant of the differentiating network is chosen to maintain waveform B positive long enough to inhibit transistor 26 for a time equal to the minimum acceptable pulse duration.

Simultaneously with the differentiation of the pulse A, integration of the pulse is commenced to produce waveform C. Waveform C commences at a negative level as determined by the bias on transistor 21 and charges exponentially towards a positive voltage level. When waveform C attains a positive level, transistor 21 will become conductive and forward bias diode 31 to inhibit output from transistor 26. The output of driver amplifier 30 is shown as waveform D. During the time that waveform B is at a positive level, diode 31 is forward biased and no output appears from amplifier 30. After waveform B has decayed to a negative level and before waveform C has charged to a positive level, diode 31 is reverse biased. Since input pulse A is of longer duration than the minimum acceptable pulse length, output from amplifier 25 will be present to charge storage capacitor 27 of the pulse stretcher. The charge on storage capacitor 27 continues beyond the trailing edge of pulse A because of the longer discharge time constant of the pulse stretcher. Output from amplifier 30 is maintained by the retained charge of capacitor 27 until waveform C reaches a positive level and causes the capacitor to discharge through forward biased diode 31. The portion of waveform D contributed by the retained charge of capacitor 27 during this interval is shown crosshatched. In this example, time constants for the differentiating and integrating networks are chosen to produce a positive excursion for waveform B for a period of $0.4\mu s$ following the leading edge of pulse A and to require a period of $1.2\mu s$ for waveform C to attain a positive level. The duration of waveform D is determined by the difference between these time constants. Therefore if waveform A is no longer than $0.4\mu s$ an output pulse of $0.8\mu s$ length will be produced. If pulse A should be considerably longer than the acceptable minimum pulse length, say, 1.5µs, waveform C will nevertheless attain a positive level in the same period as required for a shorter pulse and thus terminate the output of amplifier 30 at the normalized pulse length of 0.8µs. The charge rate of integrating capacitor 17 is independent of the input pulse length and amplitude since once the input pulse exceeds the minimum pulse length an output appears from driver 30 to maintain the charge source through diode 12 of the OR circuit. A diode 32 connected across resistor 16 provides fast recovery of the integrating circuit upon disappearance of an input pulse.

Obviously the circuit constants and structure specified herein are merely illustrative and may be varied by the substitution of known equivalents without departing from the scope of the invention, which is defined in the appended claims.

I claim:

1. A short pulse eliminating and pulse length normalizing circuit comprising:

input means to which pulses to be tested and normalized are applied, means for differentiating the output of said input means, said differentiating means providing an effective output for a time equal to the length of pulses to be eliminated, means for integrating the output of said input means, said integrating means providing an effective output after the lapse of a fixed time from the appearance of an output from said input means;

gate means to which said pulses to be tested and normalized are applied, said gate being controlled by said integrating means and said differentiating means to block transmission of said pulses whenever an effective output appears from either of said last named means; and means applying pulses transmitted by said gate to said input means in positive feedback relationship.

2. A circuit as claimed in claim 1 wherein said gate means includes pulse stretching means for prolonging the duration of said pulses to be transmitted by said gate.

3. A circuit as claimed in claim 1 wherein said input means is comprised by a logic gate of the OR type.

4. A circuit as claimed in claim 1 wherein the outputs of said differentiating and said integrating means are combined in a logic gate the output of which controls said gate means.

5. A circuit as claimed in claim 4 wherein said logic gate is of the NOR type.